US009477259B2

(12) United States Patent
Jeter et al.

(10) Patent No.: US 9,477,259 B2
(45) Date of Patent: Oct. 25, 2016

(54) CALIBRATION OF CLOCK SIGNAL FOR DATA TRANSMISSION

(71) Applicant: Apple Inc., Cupertino, CA (US)

(72) Inventors: Robert E. Jeter, Santa Clara, CA (US); Neeraj Parik, San Jose, CA (US); Sukalpa Biswas, Fremont, CA (US)

(73) Assignee: Apple Inc., Cupertino, CA (US)

( * ) Notice: Subject to any disclaimer, the term of this patent is extended or adjusted under 35 U.S.C. 154(b) by 43 days.

(21) Appl. No.: 14/597,321

(22) Filed: Jan. 15, 2015

(65) Prior Publication Data

US 2016/0209866 A1 Jul. 21, 2016

(51) Int. Cl.
| | | |
|---|---|---|
| H04L 7/00 | (2006.01) | |
| G06F 1/12 | (2006.01) | |
| G06F 1/00 | (2006.01) | |
| G06F 1/08 | (2006.01) | |

(52) U.S. Cl.
CPC .. *G06F 1/12* (2013.01); *G06F 1/08* (2013.01)

(58) Field of Classification Search
CPC ...................................................... G06F 1/10
USPC ........................................................ 713/401
See application file for complete search history.

(56) References Cited

U.S. PATENT DOCUMENTS

| | | | | |
|---|---|---|---|---|
| 5,900,762 A * | 5/1999 | Ramakrishnan | ....... | H03K 5/133 327/155 |
| 6,586,924 B1 * | 7/2003 | Okayasu | ............ | G01R 31/3191 324/532 |
| 7,323,903 B1 * | 1/2008 | Lee | .................. | H03K 19/17744 326/37 |
| 7,586,348 B2 * | 9/2009 | Kim | ...................... | H03L 7/0805 327/163 |
| 7,853,845 B2 * | 12/2010 | Dixon | .............. | G01R 31/31726 702/85 |
| 8,135,100 B2 | 3/2012 | Beukema et al. | | |
| 8,341,450 B2 | 12/2012 | Chang et al. | | |
| 8,564,345 B2 | 10/2013 | Yu | | |
| 8,588,014 B1 | 11/2013 | Fung et al. | | |
| 8,681,839 B2 * | 3/2014 | Bulzacchelli | ........... | H04L 25/14 375/220 |
| 8,729,972 B2 * | 5/2014 | Song | .................... | H04L 27/2338 329/304 |
| 8,767,471 B2 * | 7/2014 | Chen | .................... | G06F 13/1689 365/185.18 |
| 9,086,997 B2 * | 7/2015 | Dodson | ............... | G06F 11/1402 |
| 9,105,327 B2 * | 8/2015 | Prakash | .................. | G11C 7/222 |
| 2014/0019792 A1 * | 1/2014 | Oh | ....................... | G06F 13/1689 713/501 |
| 2015/0280899 A1 * | 10/2015 | Vanden Bossche | ... | H04B 17/20 375/362 |

FOREIGN PATENT DOCUMENTS

GB        2510249        7/2014

\* cited by examiner

*Primary Examiner* — Suresh Suryawanshi
(74) *Attorney, Agent, or Firm* — Meyertons, Hood, Kivlin, Kowert & Goetzel, P.C.; Erik A. Heter

(57) ABSTRACT

A method and apparatus for calibration of a clock signal used in data transmission is disclosed. The method includes a calibration having coarse and fine grain procedures. The coarse grain procedure begins from the center of a current eye and performs reads while decrementing the delay provided to the clock signal until at least one bit fails. This is repeated, from the center of the eye, incrementing until again at least one bit fails. The lower and upper last passing points are recorded. A fine grain procedure includes performing reads while decrementing, from the lower last passing point, recording points at which each bit fails until all fail. The fine grain procedure further includes incrementing, from the upper last passing point, recording points at which each bit fails until fail. Thereafter, a clock delay corresponding to the center of the new eye is determined based on the calibration data.

25 Claims, 4 Drawing Sheets

CALIBRATION OF CLOCK SIGNAL FOR DATA TRANSMISSION

BACKGROUND

1. Technical Field

This disclosure is directed to data transmission, and more particularly, to calibrating data transmissions to a clock signal.

2. Description of the Related Art

Eye patterns, or eye diagrams, are graphic illustrations that illustrate times and amplitudes at which a digital signal can be sampled at its correct value. In various types of systems that include data transmissions, sampling of signals (based on a clock signal) near a center of an eye, in terms of time, may be desirable. This may provide a signal with a sufficient amount of both setup and hold time, while also rendering it less susceptible to noise.

In memory systems, a number of data bits may be transmitted in parallel. Each of the data bits may be sampled using a clock signal that is common to all. Accordingly, the data signals may result in the various data signals being at different points of their respective eye patterns. Calibration routines may be performed such that the data signals are sampled at a receiver (e.g., at the memory) so that they are near the center of their respective eye patterns. Calibrations may be performed by sampling the data signals at various points in what amounts to sweeping the clock signal across the eye pattern, from one side of the eye pattern to the other while conducting reads of the memory.

SUMMARY

A method and apparatus for calibration of a clock signal used in data transmission is disclosed. In one embodiment, a method includes a calibration having coarse and fine grain procedures. The coarse grain procedure begins from the center of a current eye and performs reads and writes while decrementing the delay provided to the clock signal until at least one bit fails. This is repeated, from the center of the eye, incrementing the delay until again at least one bit fails. The lower and upper last passing points during the decrementing and incrementing, respectively, are recorded. A fine grain procedure (in which the step sizes are less than that of the coarse gain procedure) includes performing reads and writes while decrementing the clock delay, from the lower last passing point, recording those points at which each bit fails until all bits fail. The fine grain procedure further includes incrementing, from the upper last passing point, recording those points at which each bit fails, until all bits fail. Using the information obtained from these procedures, a passing window can be determined for each bit, and the center points for each of the bits can be aligned. Thereafter, a clock delay corresponding to the center of the new eye is determined based on the calibration data.

In one embodiment, the apparatus is a memory subsystem including a memory controller and a memory. The memory controller is coupled to receive multiple bits of data from the memory during reads, with the bits being synchronized to a data strobe signal. However, the calibration method disclosed herein is not limited to memory subsystems, and may be applied to other systems in which multiple bits of data are transmitted in accordance with a common clock signal.

BRIEF DESCRIPTION OF THE DRAWINGS

The following detailed description makes reference to the accompanying drawings, which are now briefly described.

Figure 1:
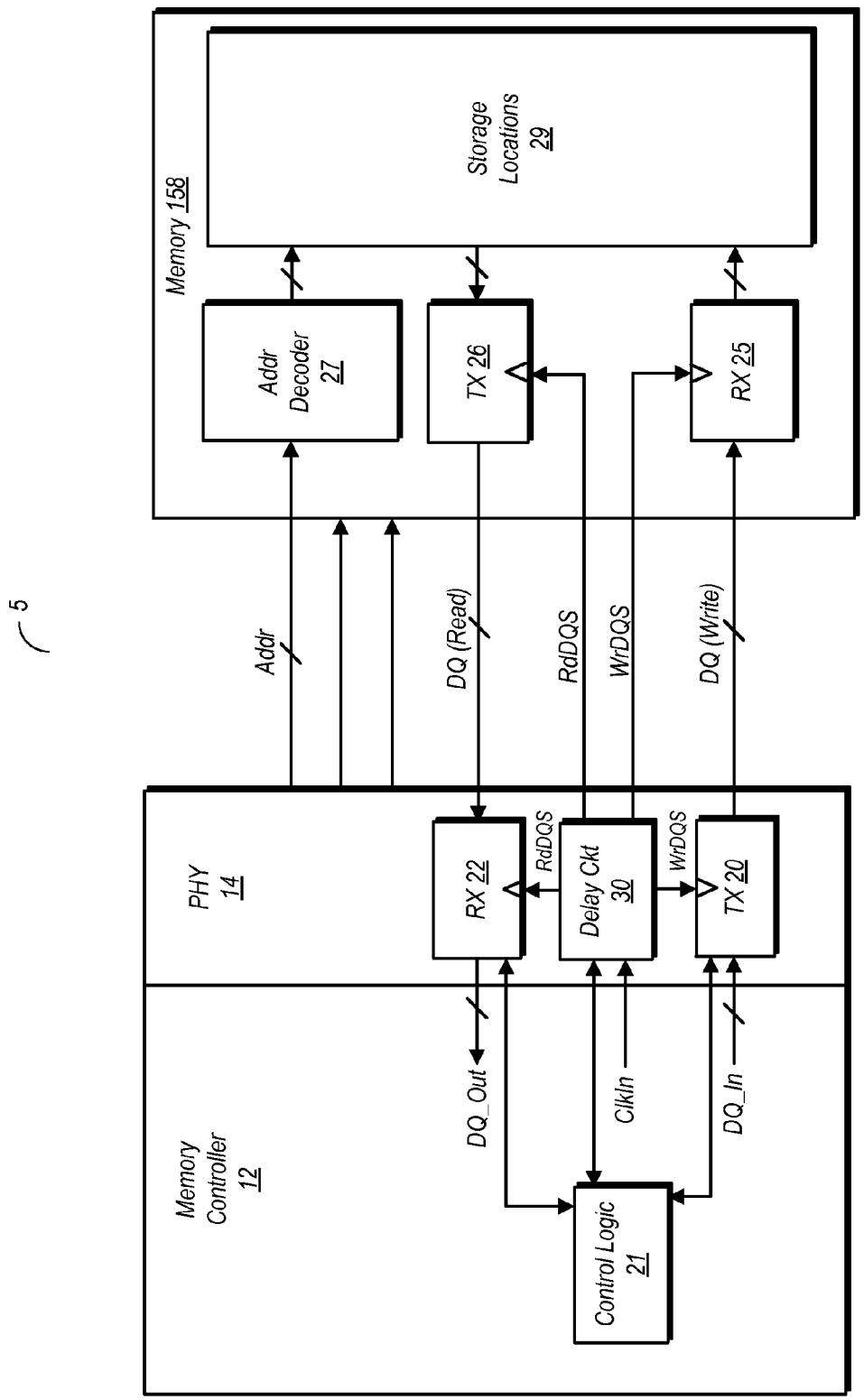
FIG. 1 is a block diagram of one embodiment of a memory subsystem.

While the disclosed subject matter is susceptible to various modifications and alternative forms, specific embodiments thereof are shown by way of example in the drawings and will herein be described in detail. It should be understood, however, that the drawings and detailed description thereto are not intended to limit the subject matter to the particular form disclosed, but on the contrary, the intention is to cover all modifications, equivalents and alternatives falling within the spirit and scope of the disclosed subject matter as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph (f) interpretation for that unit/circuit/component.

DETAILED DESCRIPTION OF EMBODIMENTS

Turning now to FIG. 1, a block diagram of a system having a memory controller and a memory is shown. In the embodiment shown, system 5 includes a memory controller 12 and a memory 158. The memory controller 12 includes a physical layer 14 which is used for interfacing with memory 158. The physical layer 14 includes a receiver 22 configured to receive data read from memory 158, and a transmitter 20 configured to transmit data to memory 158. Memory 158 includes an address decoder 27, a number of storage locations 29, a receiver 25 configured to receive data to be written and a transmitter 26 configured to transmit data that has been read. Although not explicitly shown, memory 158 may include additional logic for receiving read and write enable signals, with such logic being configured to enable selected storage locations for read and write operations, respectively. Additionally, memory controller 12 in the embodiment shown includes control logic 21, which may perform various functions, including conducting various embodiments of a calibration method discussed below.

Physical layer 14 includes a delay circuit 30 that is coupled to receive an input clock signal ('Clk'). In the embodiment shown, delay circuit 30 may include two separate paths to apply delays to the input clock signal to generate a read data strobe (adDQS') and a write data strobe ('WrDQS'). For example, one embodiment of delay circuit 30 may include a pair of delay locked loops (DLLs), one configured to output the read data strobe and one to output the write data strobe. The delays of the respective DLL's may be set according to control signals generated elsewhere in memory controller 12, e.g., in control logic 21. Types of delay circuits other than DLL's are also possible and contemplated for various other embodiments.

Delay circuit 30 may provide the read data strobe to receiver 22 in physical layer 14, as well as to transmitter 26 in memory 158. The read data strobe signal may be used in synchronizing reads of memory 158. The write data strobe may be provided to transmitter 20 of physical layer 14, along with receiver 25 of memory 158. Accordingly, the write data strobe may be used in synchronizing writes to memory 158.

Memory 158 in the embodiment shown includes an address decoder 27 coupled to receive an address from physical layer 14 of memory controller 12. Address decoder 27 may decode the received address to enable particular ones of the storage locations 29 that are to be enabled for a current memory operation. Addresses may be provided from physical layer 14 of memory controller 12 for both read operation and write operations.

The data strobe signals provided by delay circuit 30 may be subject to inherent delays, particularly on the side of memory 158. Since the clock edges of the data strobe signals are used to validate data received from memory controller 12 when received by receiver 25 at memory 158, as well as to validate data transmitted from transmitter 26 of memory 158, it is important that setup and hold time requirements for both are observed. Moreover, the data strobe signals used herein are used to synchronize the sampling of multiple bits. Furthermore, the signal paths for conveying bits between memory controller 12 and memory 158 may each be subject to their own unique delays, and thus some inter-lane skew may be present among the data bits. It is desirable that each data signal be sampled at or near the center of a window that may be depicted by an eye diagram. Accordingly, calibration procedures may be performed at certain times during operation of memory controller 12 in order to optimize the point in time at which the data strobe signals sample data. The calibration procedures may be conducted under the control of control logic 21, and involved performing a number of reads of from memory along with adjustments of an amount of delay applied to the data strobe signal being calibrated. Various embodiments of calibration procedures are now discussed in further detail.

It is noted that while the calibration procedures are discussed herein within the context of a memory subsystem and transfer of data between the memory and a memory controller, the disclosure is not limited as such. In contrast, various embodiments of the calibration methods discussed herein may be utilized with a number of systems in which data transfers of a number of bits are synchronized to a particular clock signal.

Figure 2:
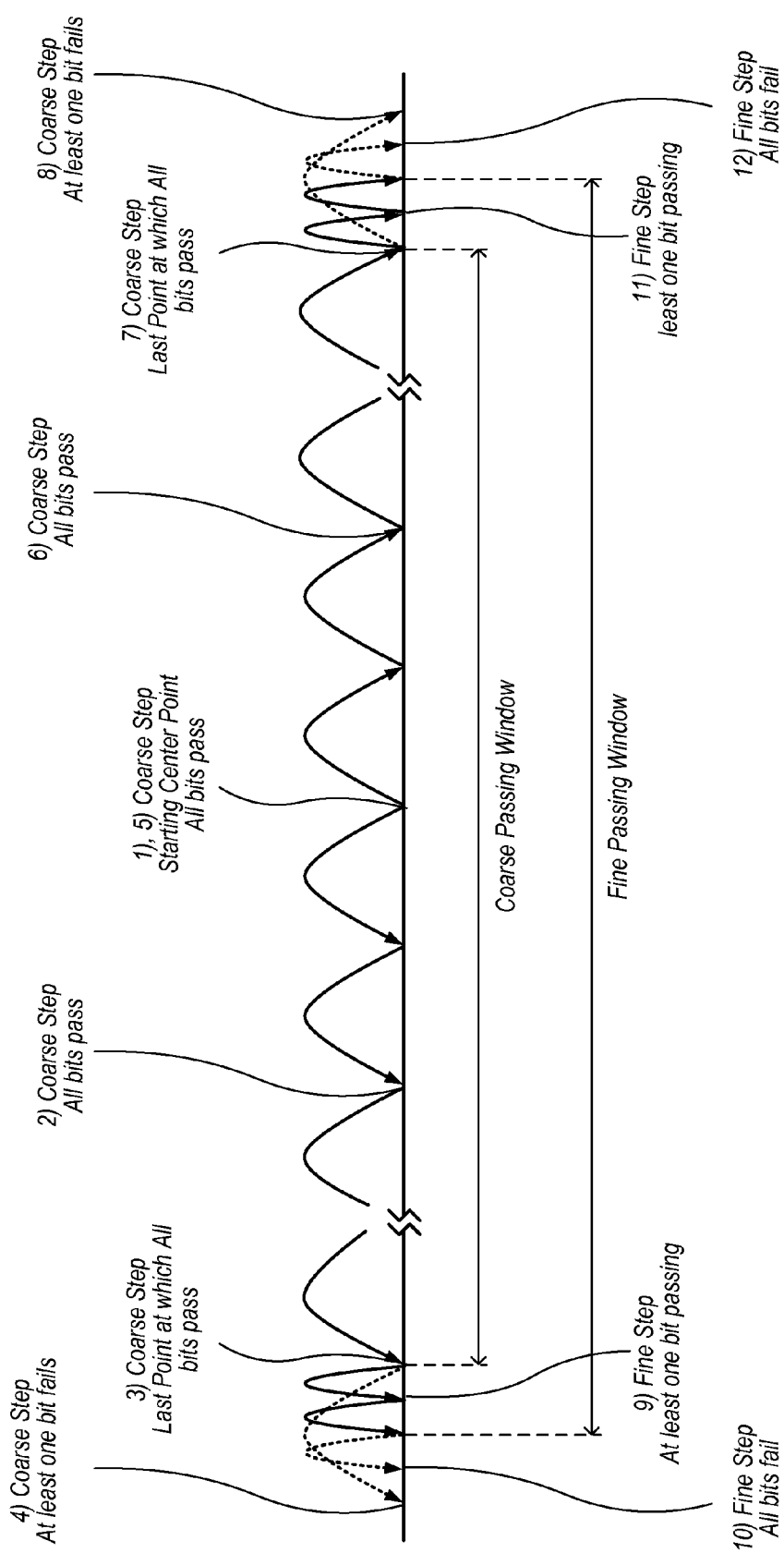
FIG. 2 is a diagram illustrating one embodiment of a procedure for performing a calibration of a clock signal to multiple data bits.

Turning now to FIG. 2, a graphic illustration of a method for performing a calibration is shown. The method illustrated in FIG. 2 includes two components, a coarse grain calibration and a fine grain calibration. The coarse and fine grain calibrations may be performed by adjusting the delay in predetermined step sizes. The delay may be adjusted by a first step size during the coarse grain calibration, and a second step size during the fine grain calibration. The first step size is greater than the second step size.

Both the coarse and fine grain calibrations involve receiving and reading data, e.g., from memory as in the memory subsystem discussed above. The reads of data may be preceded by one or more writes of data as well. For example, prior to performing a calibration of the read data strobe signal, known data may be written to the memory. For a write calibration, data may be written to the memory for each adjustment to the delay, with a corresponding read performed thereafter. While the discussion herein focuses primarily on the calibration of the read data strobe, it is to be understood that a similar calibration can be performed on the write data strobe, with corresponding writes being performed.

In each case in which data is read during the calibration, the received data may be compared to expected data. In the coarse grain calibration, it is determined whether any of the bits fail (i.e. return an incorrect value). In the fine grain calibration, the passing/failing of individual bits is determined, as is explained below.

The full calibration procedure, both coarse and fine grain, may be performed periodically, and may also be performed responsive to certain events. For example, if the memory subsystem has been operating in a low power mode in which the data strobe signals are at a reduced frequency, and subsequently enters a full power mode in which the data strobe signals operate at higher frequencies, the full calibration may be performed.

The coarse grain calibration may begin from a current center point of operation, i.e. at the current delay value of the data strobe (or more generally, clock) signal being calibrated (shown as 1 and 5 in the diagram of FIG. 2). The center point in this case is considered to be at or near the center of an eye diagram for each of the data bits. From the center point, the data strobe signal may be swept to a lower passing point and an upper passing point in a desired order. In this particular embodiment, the coarse grain calibration begins with decrementing the delay of the data strobe signal at a first step size. The delay may be decremented by, e.g., delay circuit 30 as shown in FIG. 1. After each instance in which the delay of the data strobe signal is decremented, a read of data is performed. The data that is read is compared to expected data to determine if any bits fail. As shown at 2) in the diagram, decrementing continues as long as all bits pass, returning their expected values. At 4 in the diagram, a first point at which least one bit fails to return the correct value is reached, and thus the point at which the delay is decremented to in 3 is determined to be the last lower point at which all bits passed.

Thereafter, the coarse grain calibration continues at 5) in the diagram, this time incrementing the delay applied to the data strobe signal. The step size at which the delay is incremented is the same as that at which it was decremented. Reads of data and comparison thereof to expected values is performed after each increment of delay is applied. As in 6), each time all bits pass, the incrementing of the delay continues. In 8), a first point at which at least one bit of the data returns an incorrect value is determined, and thus the delay value at 7) is determined to be a last upper point at which all bits passed. Thereafter, the coarse grain portion of the calibration is completed.

The fine grain calibration procedure may begin from either the lower last passing point or the upper last passing point. In this particular example, the fine grain calibration begins at the lower last passing point, at 9). From this point, the delay applied to the data strobe signal is decremented in a second step size, which is smaller than the first (hence the term "fine grain" in contrast to the step size of the "coarse grain" calibration). After each step of decrementing the delay, the data bits are read and compared to expected data. If any bits fail, the failures and the corresponding delay values are recorded. However, the fine grain calibration continues as long as at least one bit passes on each read. The decrementing of the delay, corresponding reads, and recording of any bit failures after each step continue until 10), when all bits fail.

The fine grain calibration continues at 11), beginning from the upper last passing point of the coarse grain calibration. The delay is incremented in the smaller step sizes of the fine grain calibration, with reads being conducted after each increment. Any failing bits, along with the corresponding delay values, are recorded. Incrementing of the delay, performing reads, and recording any bit failure may continue until 12), at which point all bits fail. At this point, the fine grain calibration is completed.

After completing the coarse and fine grain calibrations, a new delay value may be determined based on the information obtained during the coarse and fine grain portions of the calibration. For example, the new delay value may be chosen as a halfway point between the two extreme points of the fine grain calibration. Generally speaking, the coarse and fine grain calibrations result in a coarse passing window and a fine passing window, as shown in the drawing. The coarse passing window is for all bits, while the fine passing window is determined on a bit-by-bit basis. The new delay applied to the data strobe signal will be such that it places the transition of the signal near the center point of these two windows. The exact position may be based on the pass/fail information (with corresponding delay values) obtained from the coarse and fine grain calibrations. The specific method of choosing the operational value resulting from the coarse and fine grain procedures may vary from one embodiment to the next. In one embodiment, after determining the fine passing window for each bit and respective center points, the center points may be aligned. The delay may then be chosen based on the aligned center points. In yet another possible embodiment is to edge align all bits.

Figure 3:
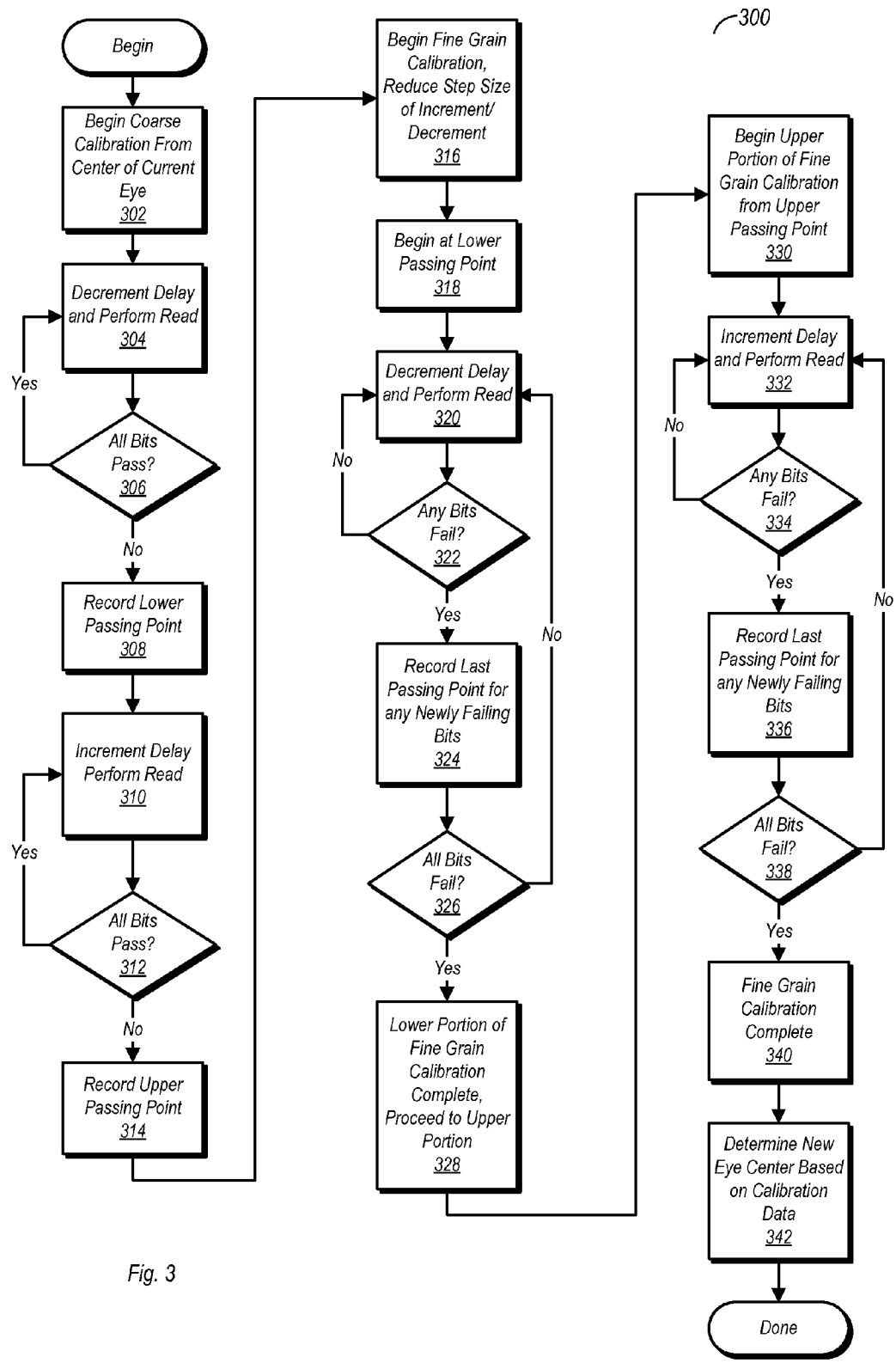
FIG. 3 is a flow diagram illustrating one embodiment of a method for calibrating a clock signal to multiple data bits.

Turning now to FIG. 3, a flow diagram illustrating one embodiment of a method for calibrating a clock signal to multiple data bits. Method 300 may be performed in various embodiments of the memory subsystem discussed above, and may be used as part of a procedure for calibrating the read and write data strobe signals. Method 300 may also be used in other systems in which a clock signal is used to synchronize the reception of multiple bits.

Method 300 begins with a coarse grain calibration beginning from the center of a current eye, i.e. at a current operational delay value for the clock signal (block 302). From this center point, the delay applied to the clock signal may be decremented, and a read of data may be performed (block 304). The amount that the delay is decremented/incremented may be a first step size that is relatively large in comparison to the step size used in the fine grain portion of the calibration that is also discussed herein. The data may be that which has been previously written to memory (e.g., in the case of the memory subsystem discussed above) or may be known data transmitted from another functional unit.

The received data may be compared to known or expected data, and a determination may be made as to whether all bits pass (block 306). All bits are considered to pass when they match their expected values. If all bits pass (block 306, yes), then the method returns to block 304, and the delay is decremented again. If one or more bits fail (block 306, no), then a lower passing point is recorded (block 308). The lower passing point may be defined as the last point at which all bits passed during the decrementing of the delay.

The delay value is then returned to the center point at which it began, and the delay is incremented (block 310). As with the decrementing, both a read of data and a comparison thereof to expected data is performed after each incrementing of the delay. If all bits pass (block 312, yes), the method returns to block 310 and is repeated. After at least one bit fails (block 312, no), an upper passing limit is recorded (block 314), with the upper passing limit being defined as the last point at which all bits passed during the incrementing of the delay. At this point, the coarse grain portion of the calibration is complete.

At block 316, the fine grain calibration begins. During the fine grain calibration, the delay is decremented/incremented at a step size that is small in comparison to the step size used in the coarse grain calibration. In this embodiment, the fine grain calibration begins at the lower passing point (block 318) that was determined during the coarse grain calibration. The delay is decremented and a read of data is performed (block 320). If no bits fail (block 322, no), then the method returns to block 320. If any bits do fail (block 322), a last passing point for each newly failing bit is recorded (block 324). The last passing point for a failing bit may be defined as the last point at which that bit returned a correct value. If some, but not all bits failed (block 326, no), then the method returns to block 320 and repeats. Typically, after at least one bit fails, block 322 will be a 'yes' for iterations occurring thereafter. Once all bits fails (block 326, yes), a last passing for the last failing bit (or bits) is recorded, and the lower portion of the fine grain calibration is complete (block 328). The method then proceeds to the upper portion of the fine grain calibration.

The upper portion of the fine grain calibration begins from the upper passing point (block 330) that was determined during the coarse grain calibration. The delay is incremented and a read of data is performed (block 332). If none of the bits fail (block 334, no), then the method returns to block 332 and incrementing/reading is repeated. If one or more bits fail (block 334, yes), the last passing point for each is recorded (block 336). If at least some of the bits passed (block 338, no), the method returns to block 332, and the incrementing/reading is repeated. At the point at which all bits fail (block 338), the final passing points for the last failing bit or bits is recorded, and the fine grain portion of the calibration is complete (block 340).

Upon completing the fine grain calibration, the information obtained from both the coarse and fine grain calibrations is used to determine a new eye center, or delay value, for the clock signal being calibrated (block 342). The new delay value may be determined in a number of different ways, as discussed above. Generally, the new delay may be set to a value that is at or near the center of an eye pattern for each of the data bits, while ensuring that setup and hold time requirements are met.

Figure 4:
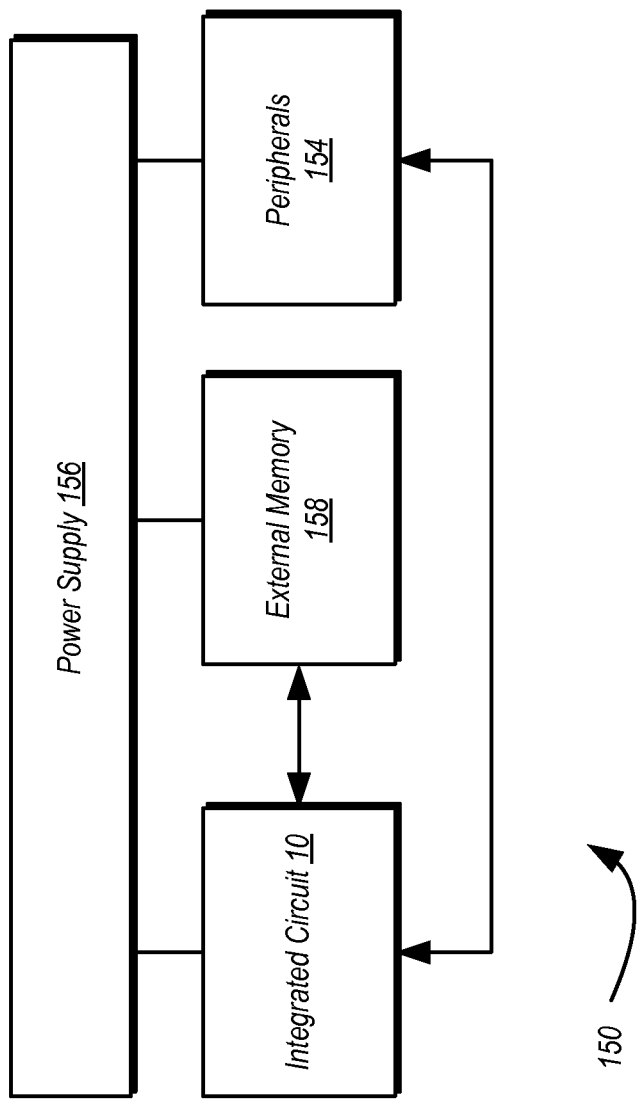
FIG. 4 is a block diagram of one embodiment of an exemplary system.

Turning next to FIG. 4, a block diagram of one embodiment of a system 150 is shown. In the illustrated embodiment, the system 150 includes at least one instance of an integrated circuit 10 coupled to external memory 158. The integrated circuit 10 may include a memory controller that is coupled to the external memory 158. The integrated circuit 10 is coupled to one or more peripherals 154 and the external memory 158. A power supply 156 is also provided which supplies the supply voltages to the integrated circuit 10 as well as one or more supply voltages to the memory 158 and/or the peripherals 154. In some embodiments, more than one instance of the integrated circuit 10 may be included (and more than one external memory 158 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as WiFi, Bluetooth, cellular, global positioning system, etc. The peripherals 154 may also include additional storage, including RAM storage, solid-state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, tablet, etc.).

The external memory 158 may include any type of memory. For example, the external memory 158 may be SRAM, dynamic RAM (DRAM) such as synchronous DRAM (SDRAM), double data rate (DDR, DDR2, DDR3, LPDDR1, LPDDR2, etc.) SDRAM, RAMBUS DRAM, etc. The external memory 158 may include one or more memory modules to which the memory devices are mounted, such as single inline memory modules (SIMMs), dual inline memory modules (DIMM5), etc.

Numerous variations and modifications will become apparent to those skilled in the art once the above disclosure is fully appreciated. It is intended that the following claims be interpreted to embrace all such variations and modifications.

What is claimed is:

1. A method comprising:
performing a coarse grain calibration of a clock signal used to synchronize reception of a plurality of data bits at a receiver, wherein performing the coarse grain calibration comprise performing a first plurality of reads while decrementing a delay of the clock signal and a second plurality of reads while incrementing the delay and determining an upper point and a lower point at which are last points at which all bits return correct values; and
performing a fine grain calibration, wherein performing the fine grain calibration comprises:
performing a third plurality of reads while decrementing the delay from the lower point and recording a respective delay value at which each delay returns an incorrect value until all bits return an incorrect value; and
performing a fourth plurality of reads while incrementing the delay from the upper point and recording a respective delay value at which each delay returns an incorrect value until all bits return an incorrect value; and
determining a new delay value for the clock signal based on results obtained from the coarse and fine grain calibrations.

2. The method as recited in claim 1, further comprising beginning the first and second plurality of reads at a current delay value of the clock signal.

3. The method as recited in claim 2, wherein performing the first plurality of reads comprise decrementing the delay at a first step size, and wherein performing the second plurality of reads comprises incrementing at the first step size.

4. The method as recited in claim 3, wherein performing the third plurality of reads comprises decrementing the delay at a second step size that is less than the first step size, and wherein performing the fourth plurality of reads comprises incrementing the delay at the second step size.

5. The method as recited in claim 1, further comprising performing first, second, third, and fourth pluralities of writes prior to performing the first, second, third, and fourth pluralities of reads, respectively.

6. The method as recited in claim 5, wherein performing the first, second, third and fourth pluralities of writes comprise writing data to a memory, and wherein performing the first, second, third and fourth pluralities of reads comprise reading the data from the memory.

7. The method as recited in claim 6, further comprising comparing the data read from memory to expected data in order to determine if any of the plurality of bits were read at incorrect values.

8. The method as recited in claim 1, further comprising periodically performing the coarse and fine grain calibrations.

9. A system comprising:
a first functional circuit configured to convey a first plurality of data bits and a clock signal; and
a second functional circuit configured to receive the first plurality of data bits and the clock signal and synchronize reception of the first plurality of bits using the clock signal, wherein the second functional circuit is further configured to convey a second plurality of bits to the first functional circuit in accordance with the clock signal;
wherein the first functional circuit is configured to perform a calibration to synchronize reception of the first plurality of data bits to the clock signal at the second functional circuit, the calibration comprising:
a coarse grain calibration comprising performing a first plurality of reads of data to the second functional circuit while decrementing a delay applied to the clock signal and a second plurality of reads while incrementing the delay, and further comprising upper and lower points in a range of delays at which all bits are read with correct values;
a fine grain calibration comprising performing a third plurality of reads while decrementing the delay, beginning from the lower point, and a fourth plurality of reads, beginning from the upper point, wherein performing the fine grain calibration further comprises recording a delay at which each individual one of the plurality of bits fails during reads performed based on the third and fourth plurality of reads; and
determining a new delay value for the clock signal based on results obtained from the coarse and fine grain calibrations.

10. The system as recited in claim 9, wherein the first functional unit is configured to, during the coarse grain calibration, begin decrementing the delay and incrementing the delay from a current delay value of the clock signal.

11. The system as recited in claim 9, wherein the first functional circuit is configured to increment and decrement the delay at a first step size during the coarse grain calibration.

12. The system as recited in claim 11, wherein the first functional unit is configured to increment and decrement the delay at a second step size during the fine grain calibration, wherein the first step size is greater than the second step size.

13. The system as recited in claim 9, wherein the first functional circuit is a memory controller, and wherein the second functional circuit is a memory.

14. The system as recited in claim 13, wherein the clock signal is a data strobe signal, and wherein the memory controller is configured to periodically perform the calibration.

15. The system as recited in claim 13, wherein the memory controller is configured to write data to the memory prior to performing calibration, and wherein performing the coarse and fine grain calibrations comprises reading the data from memory.

16. The system as recited in claim 15, wherein performing the coarse and fine grain calibrations further comprises comparing data written to the memory to data read from the memory.

17. A method comprising:
performing a coarse grain calibration of a data strobe signal, wherein performing the coarse grain calibration comprises:
successively performing reads of a plurality of bits from a memory while decrementing a delay, at a first step size, applied to the data strobe signal until at least one read returns at least one incorrect value for at least one of the plurality of bits, wherein decrementing begins from a first operational delay value;
recording a first delay value, the first delay value corresponding to a last delay at which all of the plurality of bits returned a correct value while decrementing the delay;
successively performing reads while incrementing the delay applied to the data strobe signal, at the first step size, until at least one read returns at least one incorrect value, wherein incrementing begins from the first operational delay value; and
recording a second delay value, the first delay value corresponding to a last delay at which all of the plurality of bits returned a correct value while incrementing the delay
performing a fine grain calibration of the data strobe signal, wherein performing the fine grain calibration comprises:
successively performing reads while decrementing the delay beginning from the first delay value, at a second step size less than the first, until all bits return incorrect data;
recording delay values at which each of the plurality of bits last returned a correct value while decrementing the delay;
successively performing reads while incrementing the delay beginning from the second delay value, at the second step size, until all bits return incorrect data; and
recording delay values at which each of the plurality of bits last returned a correct value while incrementing the delay; and
determining a second operational delay value based on results obtained from the coarse grain and fine grain calibrations.

18. The method as recited in claim 17 further comprising a memory controller performing the reads of data from memory.

19. The method as recited in claim 18, further comprising performing comparisons of data read from memory to expected values.

20. The method as recited in claim 17, further comprising:
performing the coarse and fine grain calibrations periodically;
performing the coarse and fine grain calibrations responsive to a clock frequency change.

21. A method comprising:
performing a coarse grain calibration of a clock signal used to synchronize the reception of a plurality of data bits at a receiver, wherein performing the coarse grain calibration comprise performing a first plurality of reads while decrementing a delay of the clock signal and a second plurality of reads while incrementing the delay and determining an upper point and a lower point at which are last points at which all bits return correct values, wherein during the coarse grain calibration, the delay is incremented and decremented at a first step size;
performing a fine grain calibration, wherein performing the fine grain calibration comprises performing a third plurality of reads while decrementing the delay of the clock signal and a fourth plurality of reads while incrementing the delay of the clock signal, wherein during the fine grain calibration, the delay is incremented and decremented at a second step size that is smaller than the first step size; and
determining a new delay value for the clock signal based on results obtained from the coarse and fine grain calibrations.

22. The method as recited in claim 21, wherein performing the coarse grain calibration comprises:
recording a first delay value, the first delay value corresponding to a last delay at which all of the plurality of bits returned a correct value while decrementing the delay; and
recording a second delay value, the first delay value corresponding to a last delay at which all of the plurality of bits returned a correct value while incrementing the delay.

23. The method as recited in claim 22, wherein the fine grain calibration comprises:
beginning decrementing the delay from the first delay value during performance of the third plurality of reads; and
beginning incrementing the delay from the second delay value during performance of the fourth plurality of reads.

24. The method as recited in claim 21, further comprising:
performing a first and a second plurality of writes during the coarse grain calibration; and
performing a third and a fourth plurality of writes during the fine grain calibration.

25. The method as recited in claim 24, wherein performing the first, second, third and fourth pluralities of writes comprise writing data to a memory, and wherein performing the first, second, third and fourth pluralities of reads comprise reading the data from the memory.

* * * * *

UNITED STATES PATENT AND TRADEMARK OFFICE
CERTIFICATE OF CORRECTION

PATENT NO.      : 9,477,259 B2                                              Page 1 of 1
APPLICATION NO. : 14/597321
DATED           : October 25, 2016
INVENTOR(S)     : Robert E. Jeter et al.

It is certified that error appears in the above-identified patent and that said Letters Patent is hereby corrected as shown below:

On the Title Page

In Item (57):

Abstract, Line 14, please delete "until fail".

Signed and Sealed this
Seventeenth Day of January, 2017

Michelle K. Lee
*Director of the United States Patent and Trademark Office*